July 29, 1958 — G. W. WOLTEMAR — 2,845,308
SEGMENTED TRACK
Filed April 28, 1954 — 3 Sheets-Sheet 1
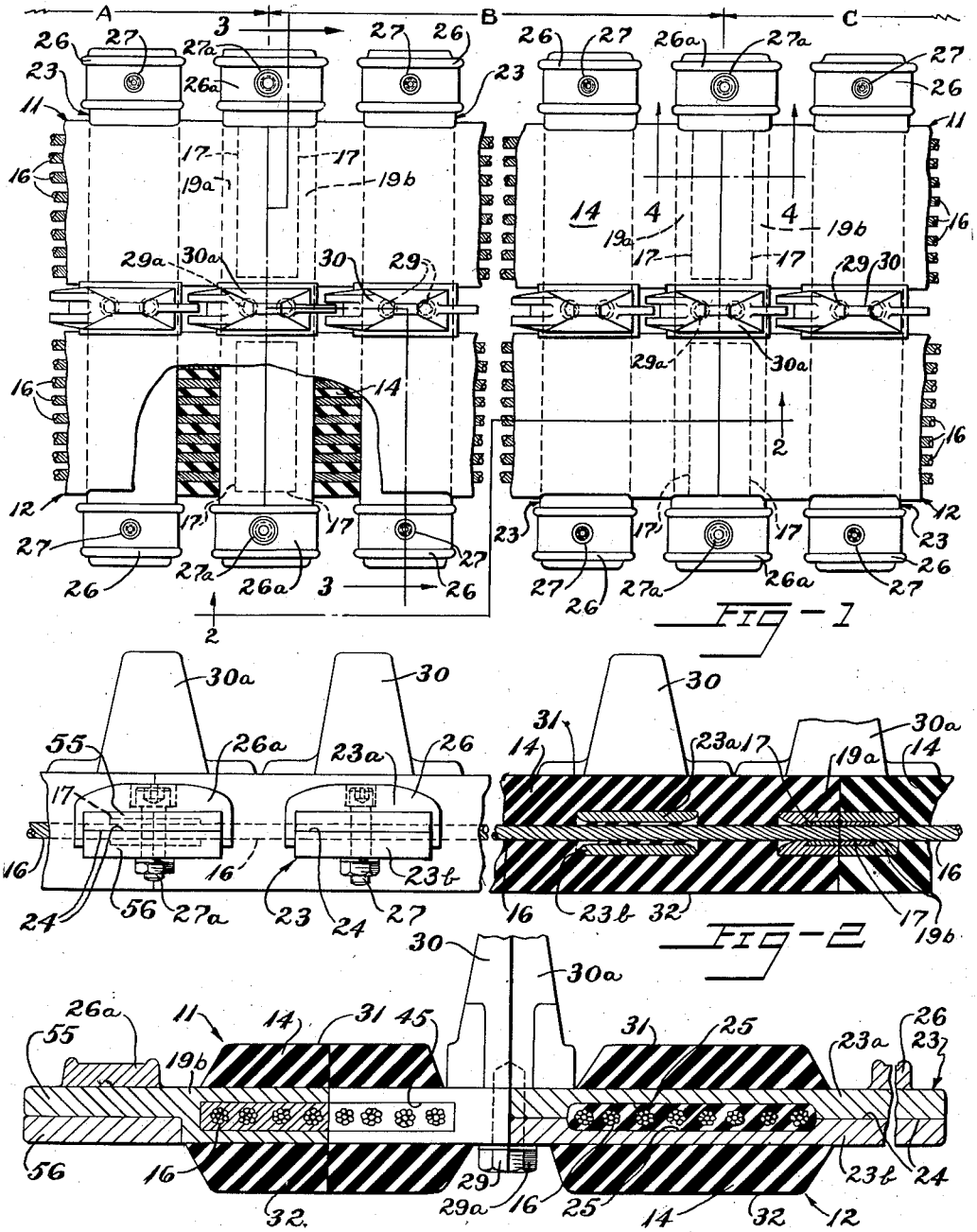
INVENTOR.
GEORGE W WOLTEMAR
BY John D Haney
ATTY July 29, 1958  G. W. WOLTEMAR  2,845,308
SEGMENTED TRACK
Filed April 28, 1954  3 Sheets-Sheet 2

INVENTOR.
GEORGE W. WOLTEMAR
BY John W. Haney
ATTY

July 29, 1958 G. W. WOLTEMAR 2,845,308
SEGMENTED TRACK
Filed April 28, 1954 3 Sheets—Sheet 3
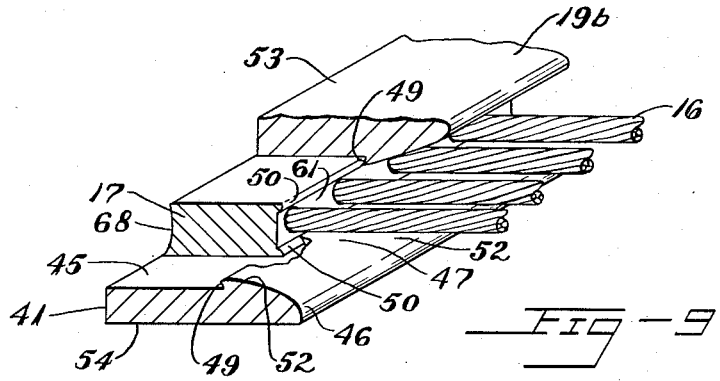
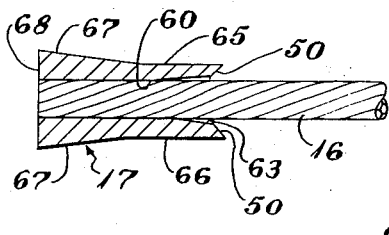
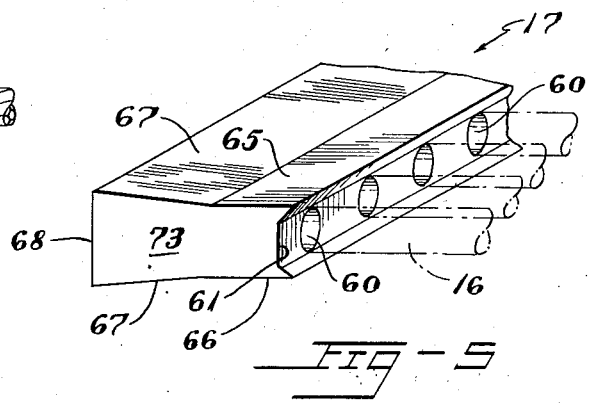
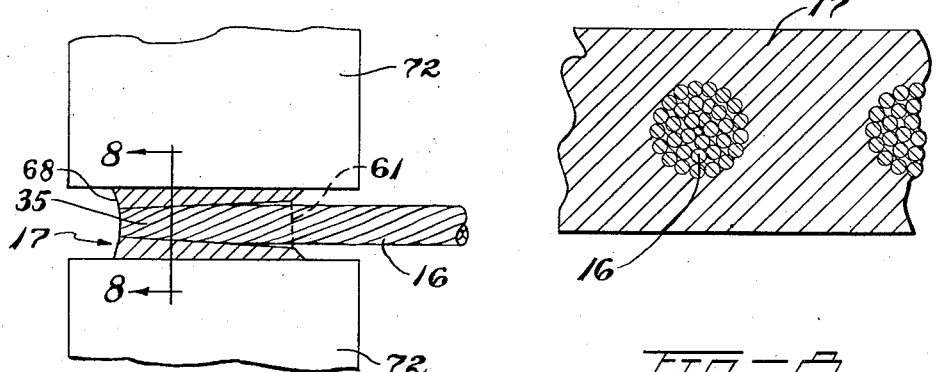
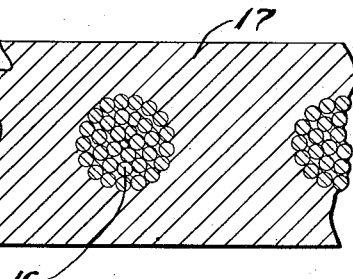
INVENTOR.
GEORGE W. WOLTEMAR
BY John D. Haney
ATTY United States Patent Office 2,845,308
Patented July 29, 1958

2,845,308

SEGMENTED TRACK

George W. Woltemar, Valencia, Pa., assignor to The B. F. Goodrich Company, New York, N. Y., a corporation of New York Application April 28, 1954, Serial No. 426,074

7 Claims. (Cl. 305—10)

This invention relates to tracks for track-laying vehicles and more particularly to the tracks for this purpose formed of individual track segments coupled together end-to-end.

In the type of track to which the present invention is directed, the individual segments are characterized by a flexible rubber body having a plurality of flexible, laterally-spaced reinforcing members such as metal stranded wire cables extending lengthwise through the rubber body from a coupling member at one end of the segment to a coupling member at the opposite end. In the constructions for these segments proposed heretofore, the operation of the track has resulted in high flexure stresses concentrated on the cables at the point they are joined to the coupling members. A particular problem in the design of segmented tracks has been to provide for engaging the ends of the cables with the coupling members in a manner which avoids this localized concentration of flexure stresses, and yet provides a connection which is strong enough to sustain the tensile driving loads imposed on the cables in service.

In accordance with this invention, this result has been accomplished by connecting the ends of the cables to transverse anchor bars which embrace the ends of the cables and exert on these ends a progressively increasing clamping pressure in a direction away from the rubber body of the track segment. The anchor bars are engageable with coupling members so that the driving loads are transmitted from the cables to the coupling members by means of the anchor bars. With this construction, an abrupt concentration of clamping pressure is avoided at the ends of the cables, and when the cables are flexed adjacent the anchor bars, the flexure stress is distributed over a longer portion of the cable which results in an increase in its flexing life. To effect the desired joint between the anchor bars and the cables, the anchor bars are deformed by swaging or the like until the bars are in resilient pressure engagement with the cables. This swaging also causes the metal of the anchor bars to flow into the interstices between the strands of the cable to provide a positive gripping effect which cooperates with the resilient pressure engagement to make the junction of the bar and the cables substantially as strong as the tensile strength of the cable.

The invention will be further described with reference to the accompanying drawing which illustrates a preferred track structure made in accordance with and embodying the principles of this invention.

In the drawings:

Fig. 1 is a plan view showing the sprocket or bogy-engaging side of several assembled track segments, portions of the segments being broken away;

Fig. 2 is a side elevation of the track segment partially in cross section and taken along the line 2—2 of Fig. 1;

Fig. 3 is a cross-sectional view taken along the line 3—3 of Fig. 1;

Fig. 5 is a perspective view showing the shape of a portion of one of the anchor bars before it is assembled with and deformed against the ends of the cables;

Fig. 6 is a cross-sectional view through the anchor bar of Fig. 4 showing the end of a cable assembled therewith;

Fig. 7 illustrates schematically the step of deforming or swaging the anchor bars into engagement with the cables;

Fig. 8 is a cross-sectional view taken along the line 8—8 of Fig. 7 and drawn to an enlarged scale to illustrate the way in which the material of the anchor bar is deformed into the interstrices of a cable;

Fig. 9 is a perspective view of portions of the coupling members and an anchor bar engaged therewith.

Figure 4:
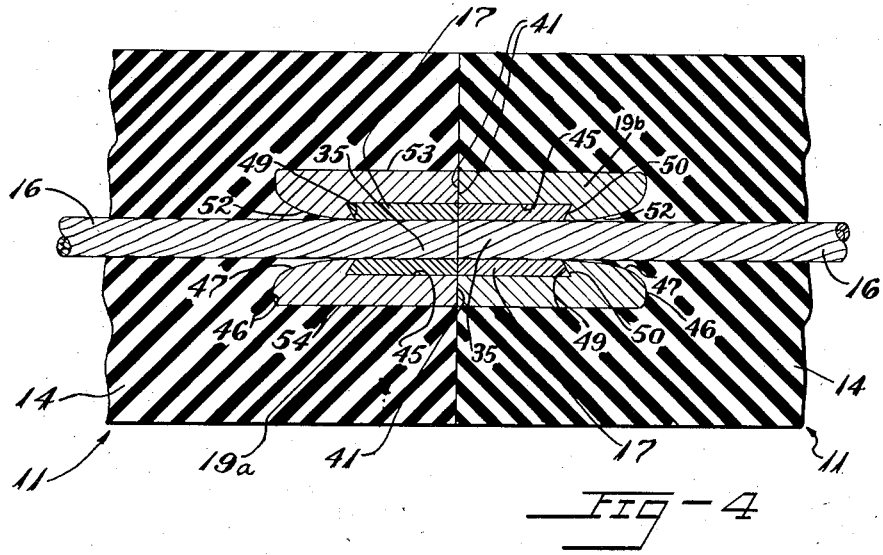
Fig. 4 is a cross-sectional view taken along the line 4—4 of Fig. 1 and drawn to an enlarged scale.

Referring to the drawings, Fig. 1 shows fragments of three track segments A, B, and C of identical construction coupled together end-to-end. Each segment is formed with a pair of parallel, laterally-spaced flexible tension bands 11 and 12 extending lengthwise along the segment for sustaining the driving loads imparted to the track. Each band includes a flexible rubber body 14 having a plurality of parallel laterally-spaced cables 16 extending lengthwise through the body in a common plane and which are preferably flexible, stranded steel wire cables. The ends of all of the cables of each band are collectively secured to a transverse anchor bar 17 at each end of the band (see Fig. 10) in a manner hereinafter described. The anchor bars 17 in turn are engaged with transverse coupling members 19a and 19b, by means of which adjacent segments are coupled together. Coupling members 19a and 19b are complementary as hereinafter described and are located at the opposite ends of their respective segments so that member 19a at the right end of a segment such as segment B (Fig. 1) is connected to member 19b of the adjoining segment C; whereas member 19b at the left end of segment B is in turn connected to member 19a of segment A.

Intermediate the coupling members 19a and 19b of each segment, there are several cross bars 23 secured transversely to the cables 16. Each cross bar 23 is formed of a pair of mating plates 23a and 23b (see the rightward portion of Fig. 3) having mating faces 24 in the plane of the cables. The mating faces 24 are provided with grooves 25 which register with each other to form a channel through which the cables extend. The portions of the cables surrounded by the registering grooves 25 are covered with rubber which is adhered to the cables and to the adjacent surfaces of the grooves 25. The ends of the mating plates 23a and 23b project beyond the bands at the sides of the segment to receive overlapping driving lugs 26 and are fastened together by bolts 27 extending through the driving lugs. The driving lugs 26 are engageable with suitable driving sprockets (not shown) of the vehicle to move the track lengthwise. The plates 23a and 23b are also secured together intermediate the bands 11 and 12 by a pair of bolts 29 (see Fig. 1) directed upwardly into a guide 30 which is adapted to engage a suitable guide sprocket (not shown) of the vehicle when the track is in operation. The rubber body 14 of each band surrounds its respective cables 16 between successive cross bars 23 and also surrounds the portions of the cross bars 23 engaged with the cables. On the side of the segment to which the guides 30 are connected, each rubber body 14 has a smooth continuous surface 31 (Fig. 3) along the length of the band against which the bogies (not shown) of the vehicle are adapted to operate. On the opposite side of the segment, each rubber body 14 extends below the cross bars to provide a ground-engaging traction surface 32.

Figure 10:
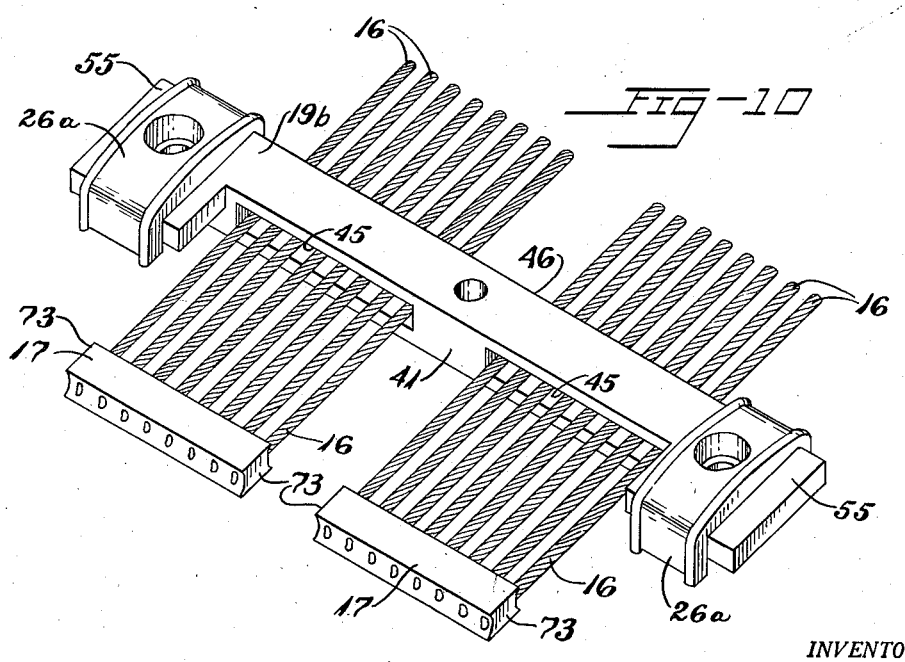
Fig. 10 is another perspective view showing one of the coupling members before the assembly with the anchor bars is completed.

Each coupling member 19 has in its rearward side 41 (the side directed away from the rubber bodies 14) a pair of mortises 45 as indicated in Figs. 3, 4 and 10 into which the anchor bars 17 of the bands are received when a segment is made. The opposite or forward side 46 of each coupling member has a pair of slots 47 each communicating with a mortise, and the ends of the cables of each band extend through their respective slots 47 to the anchor bar 17 positioned in the adjoining mortise. Along margins of the slot 47 in the mortise 45, there are grooves 49 (see also Fig. 9) which are complementary to and adapted to receive projecting lips 50 extending along the anchor bar to provide positive locking engagement for the anchor bars. The slots 47 of the coupling members are defined by curved surfaces 52, and the rubber body 14 of each band surrounds the portion of the cables between these curved surfaces 52 so that the cables may be flexed appreciably against this rubber without engaging these surfaces. The rubber bodies 14 are also vulcanized to the upper face 53 and lower face 54 of each coupling member and they extend to the rearward side 41 of each coupling member so that when two coupling members of adjoining segments are assembled as in Fig. 4 with their rearward edges 41 abutting, the rubber bodies 14 of the connected segments also abut to provide continuous bodies of rubber lengthwise of the track.

To couple two adjacent segments, a coupling member 19a of one segment is assembled with its rearward side 41 abutting the corresponding side of a mating coupling member 19b of the next adjoining segment as shown in Figs. 1 and 4. The mating coupling members 19a and 19b are complementary in shape. At each end of the coupling member 19b there is a flat lug 55 projecting from the upper portion of the member (see Fig. 10), while at the ends of the coupling member 19a to which the former is connected there are flat lugs 56 (see Fig. 3) projecting from the lower portion of the coupling member. The upper lugs 55 of member 19b overlie the corresponding lower lugs 56 in complementary relation when the two coupling members are assembled (see Fig. 2). These lugs are then additionally covered by a driving lug 26a and fastened by a bolt 27a. The mating coupling members are additionally interconnected at their medial centers by a guide 30a (Fig. 2) which straddles the abutting coupling members and is fastened by a pair of bolts 29a, one extending upwardly through each mating coupling member. The total width of the mating coupling members engaged in this manner is about equal to the width of the cross bars so that after the assembly is made it is difficult to detect the point of connection between the adjacent segments.

Figs. 5–8 illustrate a preferred mode of securing the cables to the anchor bars 17 in accordance with this invention. The anchor bars are preferably a malleable metal such as low carbon steel. The length of each bar is about equal to the width of its respective tension band, and the width of each anchor bar is approximately one-half the width of each of the coupling members. Each anchor bar is initially formed with a plurality of openings 60 extending from its forward side 61 (the side of the anchor bar directed toward the cables) sideways through the thickness of the bar in laterally-spaced, parallel relation to each other. The openings 60 are located at the same spacing as the cable so that the ends of the cables may extend straight into the anchor bar without being deflected from the position they occupy inside the rubber body 14. Usually the distance between the openings 60 will be less than the diameter of the cables in order to employ a maximum number of cables but for clarity of illustration, Figs. 5–8 show the cables located at a somewhat wider spacing. The openings 60 are preferably about the same diameter as the cables such that the cables may be inserted manually into them and fit snugly. Preferably the mouth of the openings at the forward side of the bar is bell-shaped as indicated by numeral 63 in Fig. 6 to permit substantial flexure of the cables without engaging the mouth of the openings.

The anchor bars have a generally wedge-shaped cross-sectional shape as in Figs. 5 and 6 prior to being secured to the cables. That is to say, the anchor bar is initially formed with its forward side 61 relatively thin, its upper and lower surfaces, 65 and 66, respectively, of the anchor bar near the forward side being parallel to each other. These surfaces taper gradually away from each other in the areas 67 toward the rearward side 68 of the bar so that the bar is progessively thicker toward its rearward side 68.

To fasten the anchor bars to the ends of the cables, first the cables, anchor bars, and coupling members 19a and 19b are cleaned of grease and the like and preferably if these parts are steel, they are plated with a material such as tin or brass to improve the adhesion of the rubber to them when the rubber body 14 is subsequently applied. The ends of the cables are then threaded through their respective slots 47 in the coupling members 19a and 19b and then these ends are inserted into the appropriate openings 60 in their respective anchor bars. The length of the cables between the forward sides 61 of anchor bars may be accurately adjusted in this assembly so that this length is identical for all the cables.

Next, each anchor bar together with the ends of the cables assembled with it is inserted between a pair of suitable pressure dies such as the dies 72 represented in Fig. 7 and under the intense pressure which may be applied by a suitable press, the dies crush or swage the wedge-shaped thickened portions of the anchor bar against the cables to flatten the bar to a uniform thickness about equal to the initial thickness of the forward side 61 and thereby effect gripping engagement between the anchor bar and the cables. Although the details of the swaging dies 72 are now shown, it will be understood by those familiar with the art that the dies are preferably of the type to confine the end faces 73 (Fig. 5) of the anchor bar to prevent elongation of the bar when subjected to the pressure of the dies, and also designed to engage the lips 50 along the edges of the forward side 61 of the anchor bar to maintain the dimensions of this portion of the bar.

Since the anchor bar is tapered in thickness toward the thick rearward side 68, there is relatively little metal of the bar displaced by the dies near the front side 61 of the bar but an appreciable volume of the bar near its rearward side 68 is displaced. Consequently, the anchor bar exerts a progressively increasing clamping pressure on the ends 35 of the cables from the forward side 61 toward the rearward side 68, or in other words, in a direction away from the rubber body 14 of the segment. While the portion of the cable at forward side 61 will be subjected to flexure stresses when the track is in operation, the clamping pressure is a minimum at this point so that the flexure stresses are distributed along a greater length of the cable and the flex life of the cable is greatly prolonged.

The pressure applied to the anchor bar, deforms the bar considerably beyond its elastic limit, and by confining the end faces of the bar, the metal of the bar is also urged laterally against each cable end as well as in the direction perpendicular to the bar. The cable ends tend to be radially compressed somewhat in the swaging but usually not beyond their elastic limit so that the cable ends recover when the pressure of the dies is relieved and expand outwardly against the sides of the openings to provide the desired pressure engagement. The pressure of the dies causes the bar to flow into the interstices between the several strands of the cables as indicated in Fig. 8 to provide additional locking engagement.

After the anchor bars are deformed to a uniform thickness by the dies, they may be fitted into their respective mortises in the coupling members 19a and 19b by sliding the coupling members along the cables toward the anchor bars. Ordinarily the cables, anchor bars, and coupling members are dipped in a solution of rubber cement prior to this assembly, the cement penetrating into the mortise, and filling the clearance spaces between the mortises and anchor bars. The rubber cement on the other surfaces of these members aids the adhesion of the rubber body 14 to these surfaces. After the coupling members and anchor bars are so assembled and the cement dried, the cross plates 23 are assembled with the cables at appropriately-spaced intervals intermediate the coupling members and then the rubber body 14 is vulcanized around their respective portions of the segment. The guides 30 and driving lugs 26 are normally assembled with the segment after the rubber body has been vulcanized.

Variations of the invention may be made within the scope of the appended claims.

I claim:

1. In a track for track-laying vehicles, a segmental body including flexible metal stranded cabels having ends disposed in laterally-spaced parallel relation to each other in a common plane and terminating at each end of the body, a single anchor bar at each end of the body extending transversely to all of said ends of the cables and having one side directed toward said body into which the ends of the cables project into the anchor bar, each anchor bar exerting lateral gripping pressure on each end of said cables which pressure progressively increases in a direction away from said body to secure the ends of the cable to the anchor bar, and means engageable with said anchor bars at each end of the body for connecting the body to an adjacent segmental body.

2. In a track for track-laying vehicles, a tension band of determinate length disposed lengthwise of the track and comprising a rubber body portion, a plurality of flexible metal stranded cables in said rubber body portion having ends at each end of said body disposed in a common plane in laterally-spaced parallel relation to each other, and a single anchor bar at each end of the body extending transversely to said ends of the cables and having a side directed toward the body, a plurality of openings in said side into which said terminal ends project, and the portions of the anchor bar adjacent each of said openings being deformed to laterally constrict said openings against said terminal ends of the cable a progressively increasing amount in a direction away from said body to engage the anchor bar with said ends of the cables.

3. A track segment comprising a flexible rubber body, flexible metal stranded cables extending lengthwise through the body and having ends at each end of the rubber body, and a single anchor bar extending transversely to all of said terminal ends terminating at each end of the body and collectively receiving said ends, the anchor bar laterally embracing each of said terminal ends of the cables and being deformed laterally against the ends of the cables a progressively increasing amount in a direction away from said rubber body to maintain the engagement of the anchor bar with the ends of the cables.

4. A track segment comprising a flexible rubber body, flexible metal stranded cables extending lengthwise through the body and having ends terminating at each end of the rubber body, and a single anchor bar extending transversely to all of said ends of the cables at each end of the body, the anchor bar collectively receiving and laterally embracing each of said ends of the cables and having a first side directed toward the body from which the cables project, and having a second side opposite the first side directed away from the body, and the anchor bar being deformed laterally against the ends of the cables a progressively increasing amount from adjacent said first side toward said second side to engage the anchor bar with the ends of the cables, and means engaged with each of said anchor bars for connecting the ends of the track segment lengthwise with other track segments 5. A track segment comprising a flexible rubber body, flexible metal stranded cables extending lengthwise through the body and having ends terminating at each end of the body in a common plane in laterally spaced relation to each other, a coupling member at each end of the body to which said rubber body is vulcanized and through which said ends of the cables project, a mortise in each coupling member in the side thereof directed away from the body into which said ends extend, and a single anchor bar in said mortise extending transversely to said cables and collectively embracing all of said ends of the cables, the anchor bar exerting on said ends of the cables a pressure progressively increasing in a direction away from the body portion to maintain engagement of the anchor bar and the ends of the cables.

6. A track segment in accordance with claim 5 which further comprises a lip projecting from said anchor bar, and a groove in said coupling member to engage said lip.

7. A track segment comprising a flexible rubber body, a plurality of individual flexible metal stranded cables extending lengthwise through the body and each cable having a terminal end at one end of the flexible rubber body extending parallel to and in a common plane with the corresponding terminal ends of the other cables, and a single integral metal anchor bar extending transversely to all of said terminal ends in the plane thereof and having a series of opennigs extending in laterally-spaced parallel relation substantially through the anchor bar, each with one of said cable ends disposed therein, and each opening being deformed laterally inwardly against its respective cable end a progressively increasing amount in a direction away from said body portion.

References Cited in the file of this patent
UNITED STATES PATENTS

| | | |
|---|---|---|
| 663,490 | Cleveland | Dec. 11, 1900 |
| 2,338,819 | Mayne et al. | Jan. 11, 1944 |
| 2,387,802 | Mayne | Oct. 30, 1945 |
| 2,402,042 | Haushalter | Jan. 11, 1946 |
| 2,620,550 | Granborg et al. | Dec. 9, 1952 |